Patented June 19, 1923.

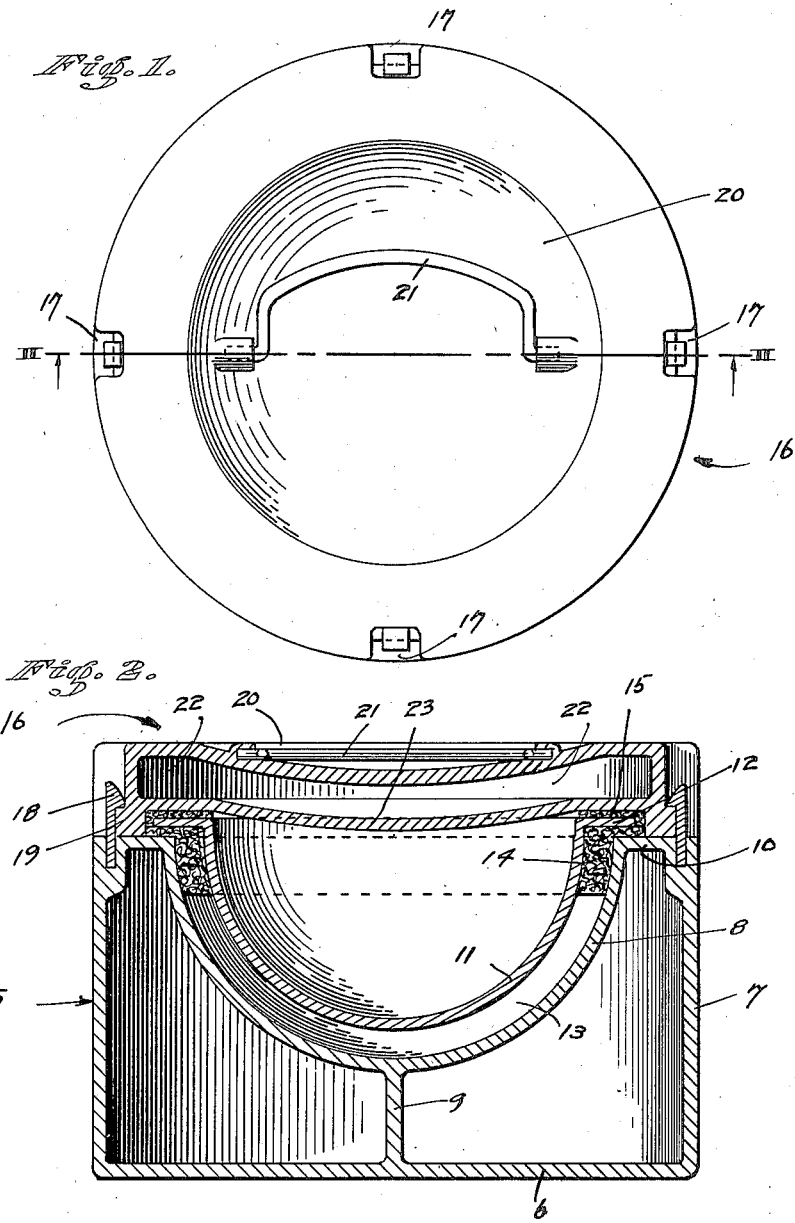

1,459,675

UNITED STATES PATENT OFFICE.

EDWARD E. JAMES, OF SAN FRANCISCO, CALIFORNIA.

HOT-SLAG RECEPTACLE.

Application filed November 7, 1921. Serial No. 513,491.

*To all whom it may concern:*

Be it known that I, EDWARD E. JAMES, a citizen of the United States, and a resident of San Francisco, county of San Francisco, and State of California, have invented a new and useful Hot-Slag Receptacle, of which the following is a specification.

My invention relates to a portable receptacle for holding hot slag or the like so that the same may be transferred from one locality to another to enable the heat units of the slag to be used for cooking or heating purposes in dwellings or other places.

In order to appreciate the advantages of my invention attention will be first directed to the waste which occurs at smelting plants where the hot slag is practically thrown away, at least in so far as concerns the heating qualities which might be derived therefrom. By the use of some suitable receptacle which could be used for collecting quantities of the slag, the same could be transferred to some location where the heat of the same could be used for some useful purpose, such for instance as cooking. According to my invention I propose to provide a portable receptacle which may be filled with the hot slag at the smelters and transferred to a dwelling or other place where the slag could be used in a so-called fireless cooker or other heating device.

The preferred embodiment of the receptacle is illustrated in the accompanying drawing in which Figure 1 is a plan view and Figure 2 a vertical section on the line 2—2 of Figure 1.

Of course it is understood that I would propose using a number of these collection receptacles, making each one of a convenient size and shape so that it may be individually handled with the utmost convenience, and further making each receptacle so that a number of them may be stored one upon the other on an automobile truck or other conveyance so that the receptacles with the hot slag contained therein may be distributed in very much the same manner as milk or other commodities are supplied to families. After the slag has been used and it is no longer fit for cooking or heating purposes, it may be dumped from the receptacle and the receptacles collected for exchange for a filled one with the empty ones returned to the filling station at the smelter and again distributed in the aforementioned manner.

Of course the manner of utilizing or putting the idea into practice is a secondary consideration in so far as my invention is concerned as there are other various ways in which the receptacle could be utilized. For instance, it might be made suitable for transporting by an individual so that a person might use it as an open cooker for heating previously cooked food, or in various other ways.

In the preferred construction of this receptacle I propose to make the same round in shape with a body (5) having a bottom (6) and side walls (7) with the top of the body closed by a basin shaped well (8) supported preferably in the bottom (6) by a web (9) and an annular flange (10). The basin (8), web (9) and flange (10) may be made as an integral part of the body in the same casting, or the parts (8), (9) and (10) may be made separately and welded or otherwise fixed to the body (5). In any event the space within the body (5) between the basin (8) should be hollow and filled with some heat insulating material. The peculiar construction of the basin (8) leaves a rounded well within the body (5) with the basin (8) acting practically as a false bottom. Supported within the well made by the basin (8) is a second basin (11), the same being made separate from the receptacle and having an annular ledge (12) adapted to be supported by the flange (10) so that the basin (11) may be supported with a space (13) between it and the basin (8). The basin (11) is adapted to be filled with the hot slag and to properly retain the heat in the device I propose to use the space (13) as a vacuum space with the vacuum maintained by the packing (14) which also acts to steady the basin (11). The packing (14) extends up under the ledge (12) and over the flange (10) so as to make a tight fit, and as a further precaution I propose to use a packing ring (15) over the ledge (12) so that the cap (16) for the body will seal the receptacle. This cap (16) is of the same diameter and shape as the body (5) with the exception of the notches (17) at spaced intervals around its periphery which leave finger openings so that the catches (18) may be pulled away from the rabbeted portions (19) of the side of the cap within the notches (17). This enables the cap to be held firmly on the body and at the same time confining the catch within the cap proper so that there are no outstanding parts to interfere with placing one receptacle on another or arranging them side by side. The cap is made with a countersunk top (20) so that the handle (21) may be out of the way when one receptacle is placed on another. For the purpose of insulation I further propose to arrange a vacuum chamber (22) in the cap with the false top (23) thereof bearing upon the packing ring (15) and sealing the receptacle.

When the basin (11) is to be filled the cap (16) of course is removed by releasing the catch (18) and the hot slag is poured into the basin (11). When filled the cap (16) may be put on and held in place by the catches (18), the handle (21) being used to lift the receptacle as previously mentioned.

When the receptacle has been transported or is to be used for cooking or heating purposes it may be placed in the fireless cooker or the like and the cap removed, which will free the heat of the slag and allow the cooking process to proceed.

I claim:

A receptacle of the class described comprising a hollow-body, a false bottom in said body comprising a basin shaped closure for the top of the bottom, a basin shaped slag container adapted to be supported above said false bottom with a vacuum space therebetween, a cap for closing the top of the receptacle and having a vacuum space adapted to overlie the top of the slag container when the cap is in place on the receptacle, said cap having notches at spaced intervals in its periphery and rabbeted ledges in the inside of said notches, and catches carried adjacent the edge of the body in the top thereof adapted to engage said rabbeted ledges for holding the cap in place, the top surface of said cap being countersunk and a handle in said countersunk for carrying the receptacle, the handle adapted to lie within the countersunk below the surface of the cap when not in use.

EDWARD E. JAMES.